(12) United States Patent
Menon et al.

(10) Patent No.: US 9,043,649 B2
(45) Date of Patent: May 26, 2015

(54) METHOD AND APPARATUS FOR OUTPUT OF HIGH-BANDWIDTH DEBUG DATA/TRACES IN ICS AND SOCS USING EMBEDDED HIGH SPEED DEBUG

(75) Inventors: Sankaran M. Menon, Austin, TX (US); Sridhar K. Valluru, Austin, TX (US); Ramana Rachakonda, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 13/526,211

(22) Filed: Jun. 18, 2012

(65) Prior Publication Data

US 2013/0339789 A1    Dec. 19, 2013

(51) Int. Cl.
*G06F 11/36* (2006.01)
(52) U.S. Cl.
CPC .................................. *G06F 11/3656* (2013.01)
(58) Field of Classification Search
CPC .............................. G06F 11/27; G06F 11/3656
USPC ........................................................... 714/30
See application file for complete search history.

(56) References Cited

U.S. PATENT DOCUMENTS

| 8,024,614 B2* | 9/2011 | Nadehara | 714/34 |
| 2001/0043648 A1* | 11/2001 | Ducaroir et al. | 375/224 |
| 2002/0007264 A1* | 1/2002 | Swoboda | 703/28 |
| 2003/0056154 A1* | 3/2003 | Edwards et al. | 714/45 |
| 2008/0040636 A1* | 2/2008 | Mayer et al. | 714/724 |
| 2010/0023807 A1* | 1/2010 | Wu et al. | 714/30 |
| 2010/0100770 A1 | 4/2010 | Mejdrich et al. | |
| 2010/0318848 A1* | 12/2010 | Yang et al. | 714/30 |
| 2011/0283141 A1 | 11/2011 | Lee et al. | |
| 2012/0159254 A1 | 6/2012 | Su et al. | |
| 2013/0054842 A1 | 2/2013 | Overby | |
| 2013/0262928 A1 | 10/2013 | Yang et al. | |
| 2013/0339790 A1 | 12/2013 | Menon et al. | |

* cited by examiner

*Primary Examiner* — Yolanda L Wilson
(74) *Attorney, Agent, or Firm* — Law Office of R. Alan Burnett, P.S.

(57) ABSTRACT

Methods and apparatus for output of high-bandwidth debug data/traces in electronic devices using embedded high-speed debug port(s). Debug data is received from multiple blocks and buffered in a buffer. The buffer's output is operatively coupled to one or more high-speed serial I/O interfaces via muxing logic during debug test operations. The buffered data is encoded as serialized data and sent over the one or more high-speed serial I/O interfaces to a logic device that receives serialized data and de-serializes it to generate parallel debug data that is provided to a debugger. The buffer may be configured as a bandwidth-adapting buffer that facilitates transfer of debug data that is received at a variable combined data rate outbound via the one or more high-speed serial I/O interfaces at a data rate corresponding to the bandwidth of the serial I/O interfaces.

25 Claims, 5 Drawing Sheets

US 9,043,649 B2

METHOD AND APPARATUS FOR OUTPUT OF HIGH-BANDWIDTH DEBUG DATA/TRACES IN ICS AND SOCS USING EMBEDDED HIGH SPEED DEBUG

TECHNICAL FIELD

The field of invention relates generally to debug testing of integrated circuits (ICs) and, more specifically but not exclusively relates to techniques for supporting transfer of debug test data during debug testing of complex ICs such as System of a Chip (SoC) designs.

BACKGROUND ART

Ever since the invention of the integrated circuit in the late 1950's, ICs have become ever more powerful and complex. Intel® Corporation introduced the world's first central processing unit (CPU), the Intel® 4004 microprocessor, comprising 2,300 transistors having a minimum feature size of 10 µm and running at a blazing 108 KHz. In approximate accordance with Moore's law (based on Intel® Corporation co-founder Gordon Moore's 1965 publication predicting the number of transistors on integrated circuits to double every two years), the speed increase has shot upward at a fairly even rate for nearly four decades. In comparison to the 4004 microprocessor, Intel's recently introduced Ivy Bridge processor has 1.4 billion transistors and employs a minimum feature size of 22 nm.

Historically, computer systems typically employed a CPU with a single processor core that was coupled to an Input/Output (I/O) chip or chipset and a memory controller, all of which comprised discreet IC's linked in communication via applicable interconnects. More recently, architectures commonly referred to as "System on a Chip" (SoC), have become prevalent in the industry. Rather than have external interconnects between discreet components, SoCs employ internal interconnects that facilitate communication between embedded components, such as processor cores and various functional blocks and modules supporting functions such as I/O, memory access, peripheral interfaces, video interfaces, etc.

Modern SoC architectures are very complex, and as a result may be more difficult to debug than systems employing discreet IC architectures. Under the traditional approach, the functionality and other testing aspects of the discreet components could be tested on an individual component basis. While there are some aspects of debug testing on SoCs that enable embedded blocks or subsystems to be isolated, other tests are preferably implemented by collecting various debug data from multiple blocks and modules concurrently. As the clock rates and complexity of SoCs increase, concurrent debug testing of multiple blocks and modules has likewise grown more complex.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DESCRIPTION OF THE EMBODIMENTS

Embodiments of methods and apparatus for output of high-bandwidth debug data/traces in ICs and SoCs using embedded high-speed debug port(s) are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Debug of present day ICs and SoCs require large amounts of debug data from various blocks of the IC/SoC to be brought out of the IC/SoC for observability via an external debugger to debug the IC/SoCs. The number of I/Os on the ICs/SoCs limit the amount of debug data that can be brought out for debug purposes. In most cases, the number of general purpose I/Os that are used to bring out the debug data are very limited in number and the data transfer bandwidths supported by these general purpose I/Os are likewise limited.

Figure 1:
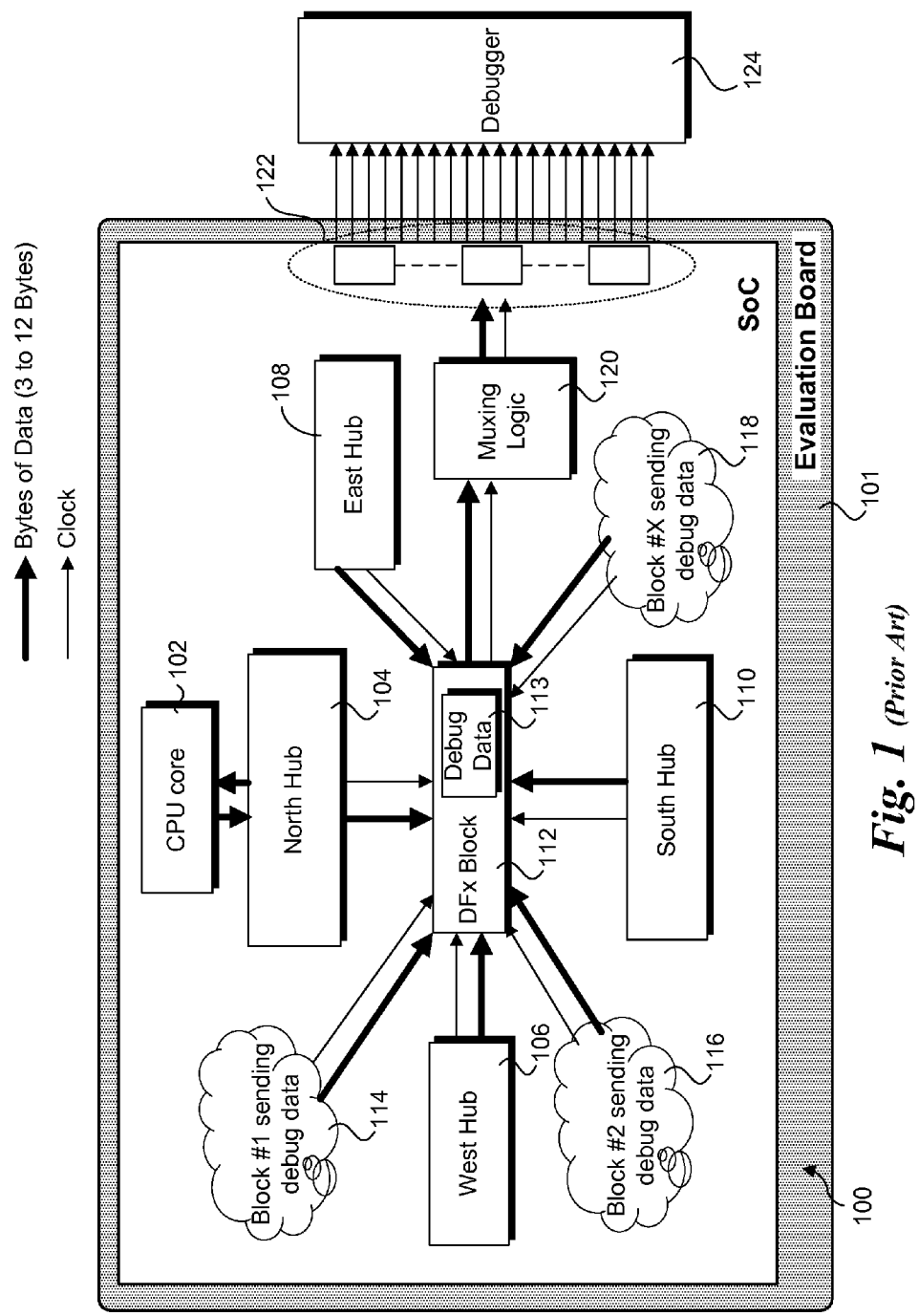
FIG. 1 is a schematic diagram illustrating a generalized conventional debug architecture implemented on an SoC.

FIG. 1 shows a generalized conventional debug architecture implemented on an SoC 100, wherein the debug architecture is simplified for ease of understanding. SoC 100 is coupled to an evaluation board 101 and includes various blocks that represent an aggregation of logical functions and/or components, including a CPU core 102, a North hub 104, a West hub 106, an East hub 108, and a South hub 110. Also depicted in SoC 100 is a DFx (Design for Testing) block 112, debug data 113, clouds 114, 116, and 118, muxing logic 120, and general purpose I/Os 122.

DFx block 112 contains logic and interfaces for controlling various debug test operations and collecting data associated with the test operations. As illustrated, DFx block 112 receives debug test data from CPU core 102 (via North hub 104), North hub 104, West hub 106, East hub 108, and South hub 110, as well as from various logic blocks not associated with these hubs, as depicted by clouds 114, 116, and 118. DFx block 112 muxes debug data 113 in muxing logic 120, and the debug data is sent to a debugger 124 communicatively coupled to SoC 100 via general purpose I/Os 122 and muxing logic 120. Generally, the debug data is sent between an SoC and a Debugger in a parallel manner by aggregating available general purpose I/Os to form a pseudo parallel interface, as depicted by the array of arrows between general purpose I/Os 122 and debugger 124.

The number of Bytes from each of the blocks (i.e., logic blocks comprising functional blocks, hubs, modules, and/or components) being tested can be anywhere from 3 Bytes to 12 Bytes or greater and the transfer bandwidth of debug data from a given block can generally be anywhere from 200 MTS (Mega Transfers per Second) to about 400 MTS or greater. Assuming 9 Bytes to be sent out from DFx block 112 would require a bandwidth of 9 Bytes * 400 MTS=28800 MTS. By comparison, a general purpose I/O pin can typically support a transfer rate of about 400 MTS per pin, which equates to a bandwidth of 3200 MTS per general purpose I/O Byte (i.e., 8 general purpose I/O pins used in parallel to transfer a Byte of debug data). To send debug data of 28800 MTS would require about 9 Bytes of general purposes I/Os, which is not normally available for sending out debug data even if any of the muxed general purposes I/Os can be used at the SoC level. The problem is that ICs/SoCs typically do not provide 9 or more Bytes of general purpose I/Os for muxing debug data, resulting in insufficient bandwidth for transferring the debug data out of the SoCs. As a result, debug testing is limited to whatever transfer bandwidth is available via the muxed general purpose I/Os.

In accordance with aspects of the embodiments disclosed herein, the insufficient bandwidth problem that occurs using the conventional approach is solved by using what is referred to herein as "embedded high-speed debug port(s)," which is implemented in combination with the physical interfaces of high-speed serial I/Os to provide bandwidth sufficient to transfer collected debug data to a debugger at bandwidths of 28800 MTS or higher.

Figure 2:
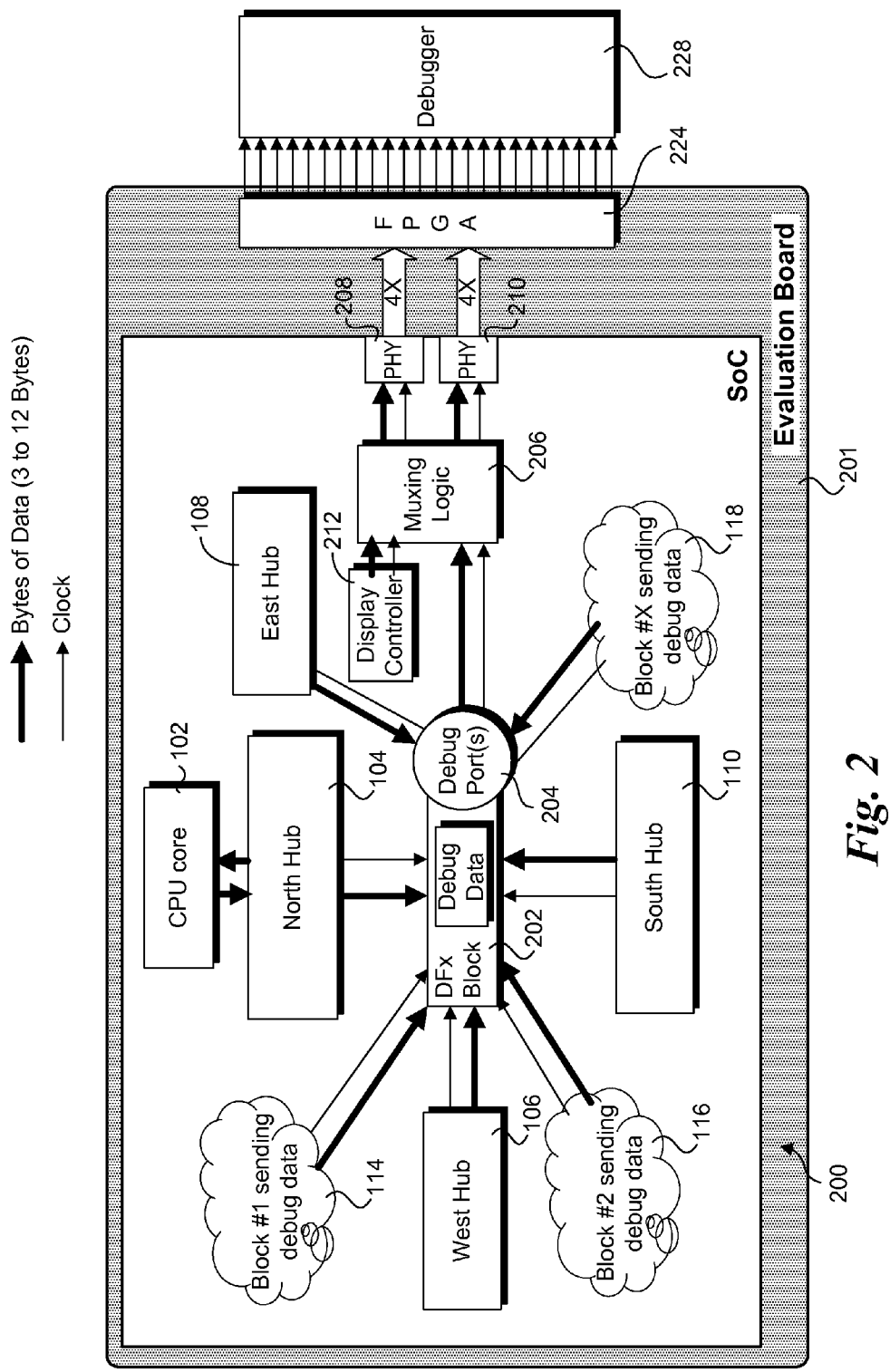
FIG. 2 is a schematic diagram illustrating a debug architecture employing embedded high speed debug port(s) to support high bandwidth transfer of debug data to a debugger, according to one embodiment.
Figure 3:
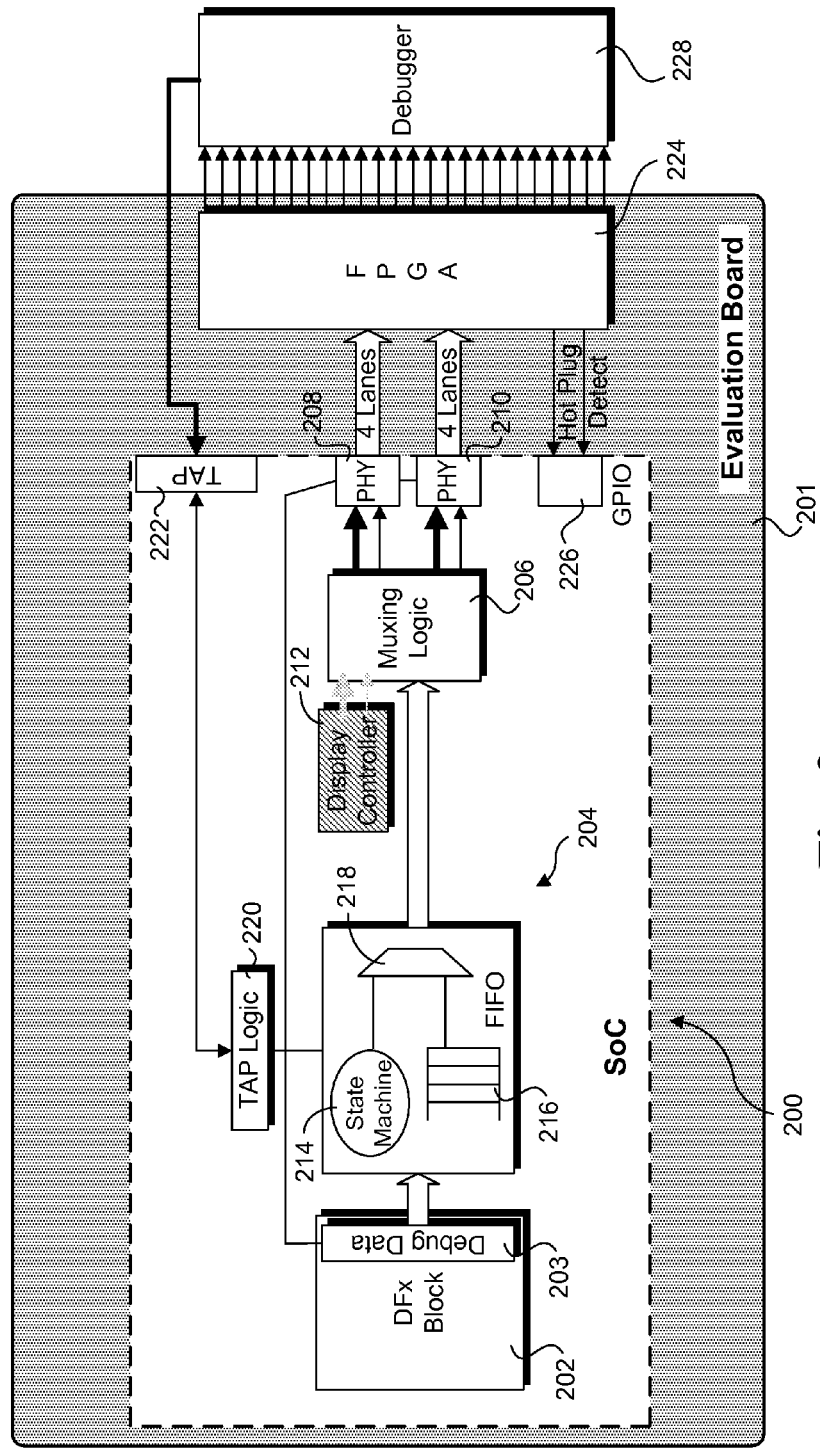
FIG. 3 is a schematic diagram illustrating further details of the embedded high speed debug port(s) and associated components and logic; according to one embodiment.

An exemplary implementation of the embedded high-speed debug port(s) approach is illustrated in FIGS. 2 and 3. In FIG. 2, SoC 200 is shown coupled to an evaluation board 201 and includes components and logic that are similar to those discussed above with reference to SoC 100 of FIG. 1 sharing common reference numbers. These include a CPU core 102, a North hub 104, a West hub 106, an East hub 108, a South hub 110 and clouds 114, 116, and 118 representing debug data originating from various logic blocks in the SoC. SoC 200 further includes a DFx block 202, debug data 203, embedded high-speed debug port(s) 204, muxing logic 206, high-speed serial I/O interfaces 208 and 210, and a display controller 212.

A blown-up detail of one embodiment of embedded high-speed debug port(s) 204 is shown in FIG. 3. The embedded high speed debug port(s) circuitry includes a state machine 214 a bandwidth-adapting First-In, First-Out (FIFO) buffer 216, and a multiplexer 218. Also depicted in FIG. 3 are TAP (Test Access Port) logic 220 and a TAP interface 222, received debug data 203, muxing logic 206, display controller 212, serial I/O interfaces 208 and 210, a FPGA (Field Programmable Gate Array) 224 and a General Purpose I/O (GPIO) port 226, and a debugger 228.

Bandwidth-adapting FIFO buffer 218 is configured to receive and buffer debug data 203, which is received from various debug test blocks/components. The rate at which the debug test data is received is generally variable. At its output end, the bandwidth-adapting FIFO buffer is emptied at a generally fixed rate corresponding to the bandwidth supported by serial I/O interfaces 208 and 210, as discussed below. The timing and coordination of the data transfer process is facilitated by state machine 214 and TAP logic 220.

In the embodiments illustrated in FIGS. 2, 3, 3a, and 3b, serial I/O interfaces 208 and 210 respectively comprise the physical layer interfaces (PHY) for an HDMI (High Definition Multimedia Interface) port and DisplayPort port. Each of these interfaces, which are used for sending video display signal data to drive an external display device, include various pins that are mapped to data signals, clock signals, shields, power and ground, hot plug detect, and various other signals, including optional signals. Selected pins from among the HDMI and/or DisplayPort PHYs on SoC 200 are implemented as I/O pins configured to support 4 (if either the HDMI or DisplayPort PHY is used) or 8 lanes (if both the HDMI and DisplayPort PHYs are used) of serialized data, as depicted by two arrows labeled "4 Lanes" in FIGS. 3 and "4x" in FIG. 2 emanating from serial I/O interfaces 208 and 210 and pointing to FPGA 224.

During normal (i.e., non-test) operations, the switches in muxing logic 206 are configured to couple signals from display controller 212 to corresponding I/O signal inputs received at the PHY interface circuitry of the HDMI and/or DisplayPort ports. If only one of the HDMI or DisplayPort PHYs is used for debug operations, then the muxing logic 206 only applies to that PHY. Conversely, during debug test operations, the switches in muxing logic 206 are configured to couple signals from the output of embedded high-speed debug port(s) 204 to I/O inputs corresponding to serial I/O interfaces 208 and 210. This is the configuration illustrated in FIG. 3, wherein cross-hatching is used to indicate the output signals from display controller 212 are disconnected from corresponding I/O inputs corresponding to serial I/O interfaces 208 and 210 via muxing logic 206.

Today's high-speed serial I/Os (such as HDMI or DisplayPort) typically operate at transfer bandwidths from 1.6 Gbps to 5 Gbps with about 4 lanes per serial I/O port. As stated above, SoC 200 is configured to employ two serial I/Os (208 and 210) that are combined to support 8 lanes of serialized data. In one embodiment, each of serial I/O interfaces 208 and 210 support a baseline bandwidth of about 2.7 Gbps, while also being configurable to support higher bandwidths including 3.3 Gbps and 5 Gbps. The bandwidth carrying capacity of the 8 lanes running at 3.3 Gbps is approximately 26,400 Mbps, and when serial I/O interfaces 208 and 210 are operated at 5 Gbps, the data-rate achievable is approximately 40,000 Mbps. When the debug data bandwidth discussed above corresponds to 9 Bytes running at 400 MTS=28800 Mbps, the output bandwidth of the combined serial I/O interfaces with 8 lanes is sufficient to facilitate transfer of debug data at a bandwidth of approximately 28800 Mbps.

During debug test operations, embedded high-speed debug port(s) 204 employs bandwidth-adapting FIFO buffer 218 and associated control logic to "match" the bandwidth corresponding to the data rate at which debug data 203 is received from various blocks to the data rate supported by serial I/O interfaces 208 and 210. In order to match the bandwidth of the debug data-rate from the various outputs of the blocks, the embedded high speed debug port(s) 204 takes the debug data and fills bandwidth-adapting FIFO buffer 216 at the input rate of debug data 203 as it is received, while the output of FIFO buffer is pulled at the rate at which the serial I/Os are operated. In one embodiment the bandwidth-adapting FIFO buffer is configured as an elastic buffer, enabling the buffer to be filled at a rate that exceeds the output transfer rate for short durations, thus supporting bursty debug data rates that are greater than the bandwidth supported by serial I/O interfaces 208 and 210.

In one embodiment, embedded high speed debug port(s) 204 also adds synchronizing characters as well as 8b/10b encoding to serialize the debug data that is to be sent out via serial I/O interfaces 208 and 210. Logic in FPGA 224 is used to de-serialize the serial data to extract the original debug data, which is then provided to debugger 228 as parallel data. The use of 8b/10b encoding is used in high-speed serial interconnects, such as Peripheral Component Interconnect Express (PCIe), to achieve DC-balance and for clock recovery, enabling a sending component and receiving component to be operated using separate clocks.

Figure 3A:
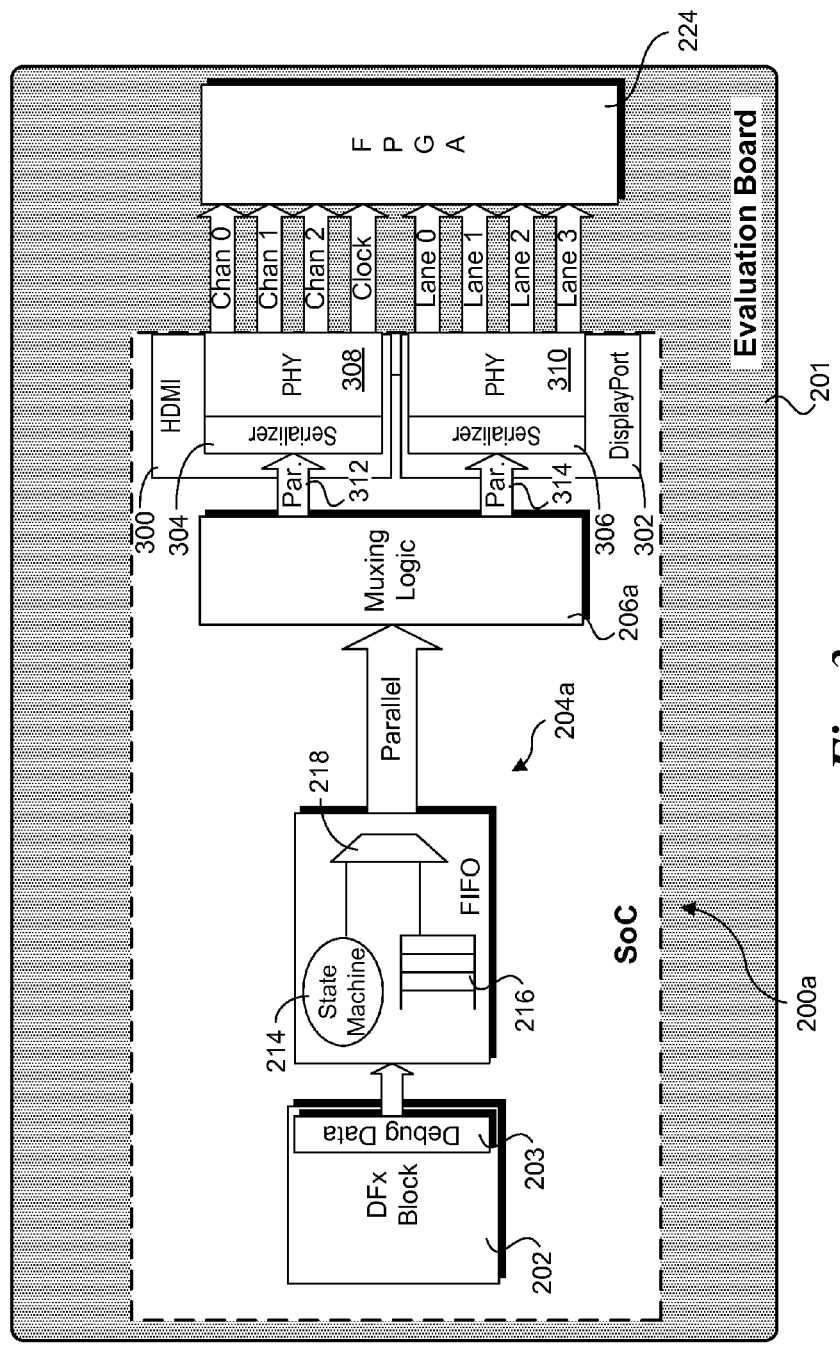
FIG. 3a shows further details of one embodiment of a debug architecture employing serialization operations at PHYs.

FIG. 3a shows further details of one embodiment of a debug architecture employing serialization operations at one or more PHYs. As illustrated, an SoC 200a includes an HDMI interface 300 and a DisplayPort interface 302. HDMI interface 300 includes a serializer 304 and a PHY 308, while DisplayPort interface 302 includes a serializer 306 and a PHY 310. Serializers 304 and 306 are used to serialize portions of parallel input data 312 and 314 that are output from embedded high-speed debug port(s) 204a and operatively coupled to the serializers' inputs via muxing logic 206a. The serializers convert received parallel data into serial data that are transferred via PHYs 308 and 310 to FPGA 224. In general, the serializers may be configured to perform 8b/10b encoding and/or add synchronization, or the received parallel data may already be encoded as 8b/10b and/or have had synchronization added by embedded high-speed debug port(s) 204a. In one embodiment, each of the serializer/PHY combinations is implemented as part of a standard PHY interface block used on an SoC for various serial I/O interfaces, such as being implemented for one or more of HDMI, DisplayPort and other types of high-speed serial I/O interfaces (e.g., USB2, USB3, Thunderbolt interfaces, etc.).

In one embodiment implementing an HDMI interface, transmission facilities for 4 lanes of serial I/O data are obtained via use of HDMI data channels 0, 1, and 2, along with the HDMI Clock, each of which comprises a differentiated signal pair. In one embodiment implementing DisplayPort interface, 4 lanes of serial I/O are obtained by using differentiated signal pairs corresponding to DisplayPort Lanes 0, 1, 2, and 3. Although depicted as employing PHYs 308 and 310, it will be understood that this is merely an exemplary configuration, as either of PHYs 308 and 310 may be employed individually, in combination with each other (as shown), or in combination with other PHYs (not shown).

Figure 3B:
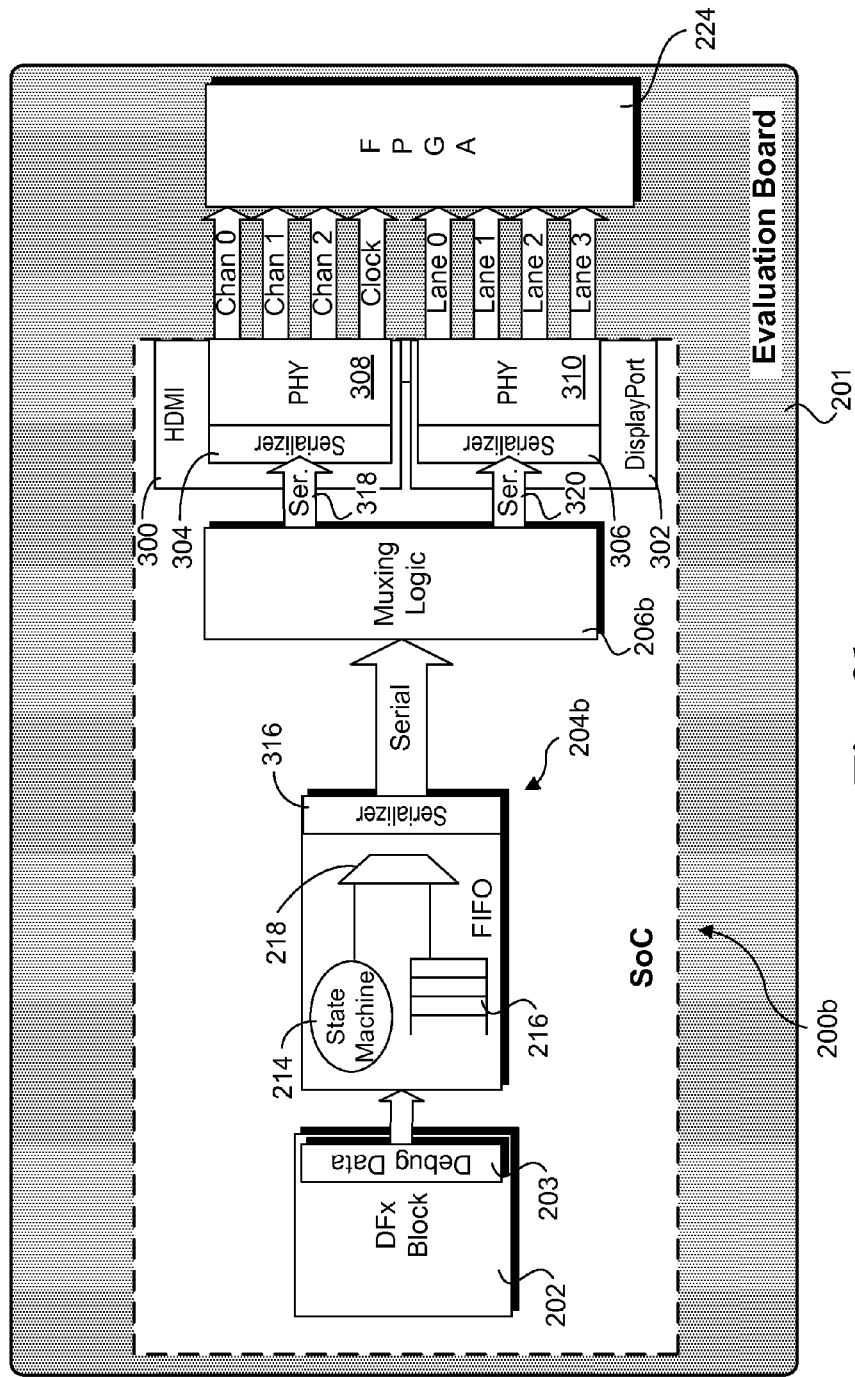
FIG. 3b shows further details of one embodiment of a debug architecture employing serialization operations at the embedded high-speed debug port(s).

FIG. 3b shows further details of one embodiment of a debug architecture employing serialization operations at the embedded high-speed debug port(s). As illustrated, embedded high-speed debug port(s) 204a includes a serializer 316, which is configured to convert parallel debug data into serialized data streams 318 and 320 that are routed to PHYs 308 and 310 via muxing logic 206b. In one embodiment, serialized data streams 318 and 320 are provided as inputs to PHYs 308 and 310. In another embodiment, serialized data streams 318 and 320 are provided as inputs to serializers 304 and 306, which may be configured to employ additional signal conditioning operations on the serialized data streams in conjunction with operations performed by PHYs 308 and 310. As before, serializer 316 may be configured to employ 8b/10b encoding and/or add synchronization for serialize streams 318 and 320.

Under various embodiments, debug data rates of approximately 28800 MTS or greater may be supported. For example, operating a combination of the HDMI/DisplayPort serial I/O ports at 5 Gbps provides an output bandwidth of approximately 40,000 Mbps, which provides sufficient headroom to send higher bandwidth debug data beyond 9 Bytes running at 400 MTS, such as 12 Bytes of debug data running at 400 MTS, which would consume an output bandwidth of approximately 38,400 MTS.

The embedded high speed debug port(s) approach is not limited to use of video display ports, but rather may be implemented over various types of high-speed serial I/O ports and interfaces in combination with applicable muxing logic. For instance, such high-speed serial I/Os include but are not limited to PCIe ports, Intel® QuickPath Interconnect® (QPI) ports, serial memory interfaces, USB2, USB3, or Thunderbolt interfaces, etc. Moreover, the techniques may be implemented over a single serial I/O, or a combination of serial I/Os. For example, PCIe supports transfers over up to 32 lanes via a single PCIe port.

In general, each high-speed serial I/O interface will be associated with a corresponding functional block during normal I/C or SoC operations (or at least during operational modes when the functional block and its associated high-speed serial I/O is being used). In the context of the embodiment illustrated in FIGS. 2 and 3, display controller 212 comprises a functional block associated with each of high-speed serial I/O interfaces 208 and 210. In the context of using a PCIe port or other high-speed serial interconnect, a corresponding PCIe logic block (e.g., one or a combination of logic corresponding to a PCIe agent, PCIe interface, or PCIe root port) would comprise a functional block associated with the high-speed serial I/O interface.

Under typical nomenclature, a high-speed serial I/O component may be referred to as a serial I/O interface, a serial I/O port, or simply a serial I/O. In some instances, the terms "interfaces" and "ports" may generally be referring to the same things, even though they may use different terms by convention. For example, an I/O interface on a device that has a connector often is referred to as an I/O port, while an interface between a serial I/O on an SoC and a serial I/O on a host device in a platform including the SoC may be referred to as an interface or a port, depending on the type of device and historical usage. In order to avoid confusion, the terminology "high-speed serial I/O interface" is used herein, including the claims, to refer to an interface and/or port corresponding to an associated high-speed serial I/O component on an SoC or IC. Accordingly, the usage of the terminology high-speed serial I/O interface is not to be limited to only components commonly referred to as serial I/O interfaces, but is intended to also cover high-speed serial I/Os in general including components commonly referred to as serial I/O ports.

Embodiments employing aspects of the embedded high speed debug port(s) techniques disclosed herein provide significant advantages over today's IC and SoC debug testing techniques. The substantially greater debug data rates supported by implementations of the techniques facilitate enhanced debug testing that was previously unavailable. The techniques are also scalable, supporting debug testing of more complex ICs and SoCs, including both existing and future designs. The support for higher debug data rates also facilitates concurrent debug testing for a greater number of blocks than available under conventional techniques, enabling more complex debug testing to be performed.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In various figures, the elements in some cases may each have a common reference number or a different reference number to suggest that the elements represented could be different and/or similar. However, an element may be flexible enough to have different implementations and work with some or all of the embodiments shown or described herein. The various elements shown in the figures may be the same or different.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Alternately, the terminology "operatively coupled" may be used to convey two or more elements that are directly coupled or coupled via one or more intermediate components An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for debug testing of an electronic device, comprising: receiving debug data from a plurality of blocks; buffering the debug data in a buffer; operatively coupling an output of the buffer to at least one high-speed serial Input/Output (I/O) interface on the electronic device during debug test operations, wherein each of the at least one high-speed serial I/O interface is associated with a non-debug function during normal operation of the electronic device; and sending buffered debug data outbound from the electronic device via the at least one high-speed serial I/O interface, wherein at least one high-speed serial I/O interface comprises an HDMI port having a plurality of I/O pins, and wherein multiple lanes of serialized debug data is transferred from the HDMI port by sending differentiated signals over selected I/O pins from amongst the plurality of I/O pins.

2. The method of claim 1, further comprising:
receiving debug data from the plurality of blocks at a combined data rate that is variable; and
outputting debug data from the buffer at a fixed data rate corresponding to a bandwidth supported by the at least one high-speed serial I/O interface.

3. The method of claim 1, wherein the buffer comprises a bandwidth-matching First In, First Out (FIFO) buffer.

4. The method of claim 1, further comprising employing muxing logic to operatively couple the output of the buffer to the at least one high-speed serial I/O interface.

5. The method of claim 1, further comprising encoding the debug data as serial data using 8b/10b encoding.

6. The method of claim 1, wherein at least one of the at least one high-speed serial I/O interfaces is associated with a display function.

7. The method of claim 1, wherein the at least one high-speed serial I/O interface comprises two high-speed serial I/O interfaces.

8. The method of claim 1, wherein at least one high-speed serial I/O interface comprises a DisplayPort.

9. The method of claim 1, wherein the electronic device comprises an integrated circuit.

10. The method of claim 1, wherein the electronic device comprises a System on a Chip (SoC).

11. The method of claim 1, further comprising:
receiving debug data via the at least one high-speed serial I/O interface as serial data; and
de-serializing the serial data to generate parallel debug data.

12. The method of claim 1, wherein the method supports a debug data bandwidth of approximately 28800 MTS (Megatransfers per second) or greater.

13. The method of claim 1, wherein the debug data is received from the plurality of blocks as parallel data, and the method further comprises serializing the debug data.

14. An apparatus, comprising: a plurality of logic blocks; a debug test block configured to receive debug data from at least a portion of the plurality of logic blocks when the apparatus is operated in a debug test mode; a plurality of input/output (I/O) interfaces; a buffer operatively coupled to the debug test block; and muxing logic, configured to operatively couple an output of the buffer to at least one high-speed serial I/O interface from among the plurality of high-speed serial I/O interfaces when the apparatus is operated in the debug test mode, and configured to operatively couple each of the at least one high-speed serial I/O interface to an associated functional block when the apparatus is operated in an operational mode employing the functional block, wherein, when the apparatus is operated in the debug test mode, the buffer is configured to buffer debug test data received from debug test block and the apparatus is configured to send buffered debug test data outbound via the at least one high-speed serial I/O interface as serialized debug test data, wherein at least one high-speed serial I/O interface comprises an HDMI port having a plurality of I/O pins, and wherein multiple lanes of serialized debug data is transferred from the HDMI port by sending differentiated signals over selected I/O pins from amongst the plurality of I/O pins.

15. The apparatus of claim 14, wherein the buffer is configured to receive debug data at a variable data rate and output buffered debug data at a fixed rate corresponding to a bandwidth supported by the at least one high-speed serial I/O interface.

16. The apparatus of claim 14, wherein the buffer comprises a bandwidth-matching First In, First Out (FIFO) buffer.

17. The apparatus of claim 14, wherein the apparatus is further configured to encode the debug data into serialized data using 8b/10b encoding.

18. The apparatus of claim 14, wherein at least one of the at least one high-speed serial I/O interfaces is associated with a functional block associated with a display function.

19. The apparatus of claim 14, wherein the at least one high-speed serial I/O interface comprises two high-speed serial I/O interfaces.

20. The apparatus of claim 14, wherein one of the at least one high-speed serial I/O interface comprises a DisplayPort.

21. The apparatus of claim 14, wherein the apparatus comprises an integrated circuit.

22. The apparatus of claim 14, wherein the apparatus comprises a System on a Chip (SoC).

23. The apparatus of claim 14, wherein the apparatus is configured to support a debug data bandwidth of approximately 28800 MTS (Mega-transfers per second) or greater.

24. The apparatus of claim 14, wherein the debug data is received from the plurality of blocks as parallel data, and the apparatus is configured to serialize the debug data into a serial form.

25. The apparatus of claim 14, further comprising logic configured to:
  receive debug data via the at least one high-speed serial I/O interface as serial data; and
  de-serialize the serial data to generate parallel debug data.

* * * * *